UNITED STATES PATENT OFFICE.

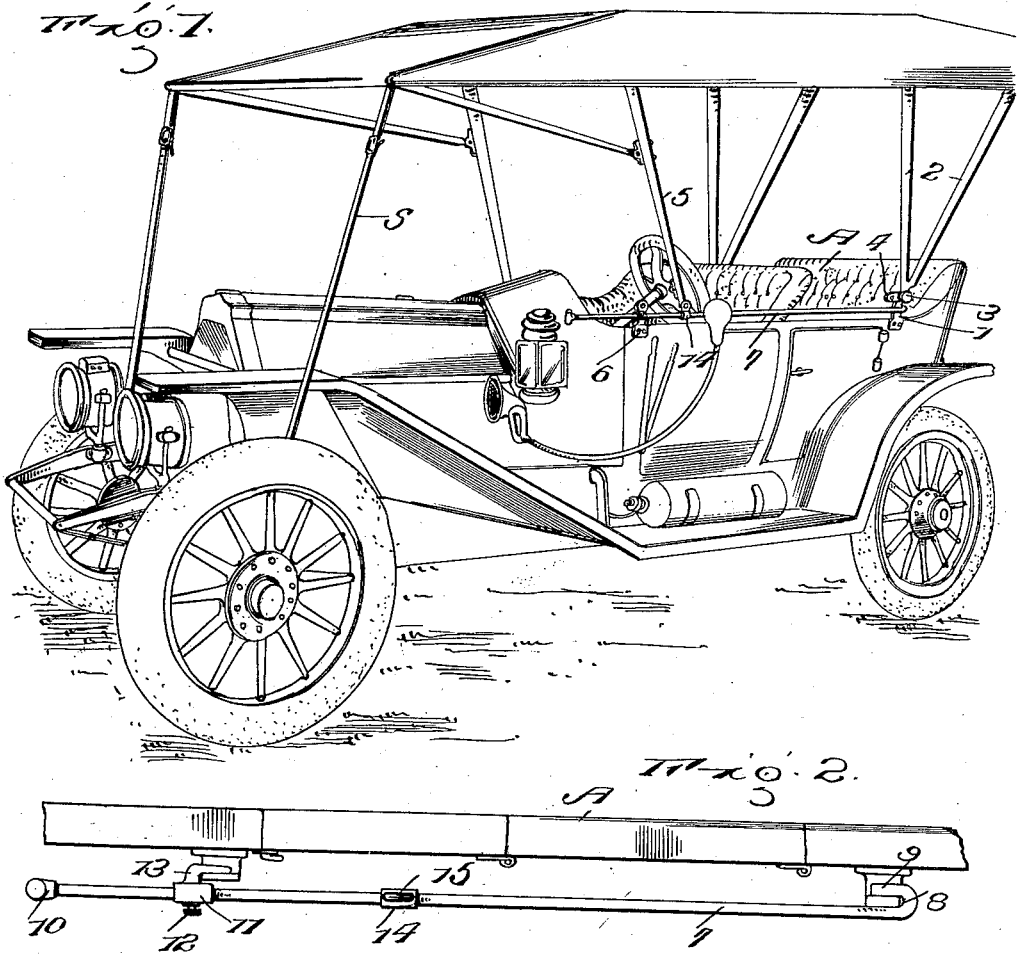

OTIS COOK, OF TALLADEGA, ALABAMA.

DEVICE FOR RAISING AND LOWERING AUTOMOBILE-TOPS.

1,073,332.   Specification of Letters Patent.   Patented Sept. 16, 1913.

Application filed May 22, 1912. Serial No. 699,081.

*To all whom it may concern:*

Be it known that I, OTIS COOK, citizen of the United States, residing at Talladega, in the county of Talladega and State of Alabama, have invented certain new and useful Improvements in Devices for Raising and Lowering Automobile-Tops, of which the following is a specification.

This invention has as its object to provide a device designed to be employed for the purpose of assisting one in setting up the tops of automobiles. As is well-known, the rear bows of an automobile top are permanently pivoted to brackets located at opposite sides of the body of the machine at the rear thereof, and that when the top is not in use, the pivot ends of the forward bows are detachably engaged in ears, carried by these brackets and by the lower ends of the respective bows and, when the top is to be set up, must be disengaged from the ears and carried forwardly and engaged in two brackets which are located at opposite sides of the automobile body near the front thereof. It is obvious therefore, that at the present time it is necessary to manually support the forward bows and the forward portion of the automobile top as the top is being set up or laid down, and without assistance this cannot be readily accomplished.

The present invention, therefore, aims to provide a device which may be readily and quickly applied to the brackets of the rear and forward bows and which will slidably support the lower or pivot ends of the forward bows as these bows are moved forwardly or rearwardly, depending upon whether the top is being set up or let down.

It is one aim of the invention to so construct the supporting device, above mentioned that it may be conveniently carried, readily applied and dismounted and that it will be capable of adjustment for application to various types of automobiles in which the front and rear brackets are located at different distances apart.

In the accompanying drawings:—Figure 1 is a perspective view illustrating the invention applied to an automobile showing the forward bows partly slid in a forward direction. Fig. 2 is a top plan view in detail of one of the supporting devices. Fig. 3 is a perspective view thereof detached. Fig. 4 is a view illustrating a slight modification of the invention.

Corresponding and like parts are referred to in the following description and indicated in all the views of the accompanying drawing by the same reference characters.

In the drawings, the body of the automobile is indicated in general by the reference character A, and the numeral 1 designates one of a pair of brackets which are mounted upon the opposite sides of the body, at the rear thereof and which support the rear bows, these bows being indicated at 2 and being pivotally mounted at their lower ends as at 3 upon the said brackets 1. Each of the brackets 1 and the bows 2 at their lower pivoted ends is provided with an apertured ear 4, as is usual, into which may be fitted the lower or pivot end of the respective forward bow, indicated at 5. In addition to the brackets 1 the body is provided at its opposite sides and near its front with two brackets 6 with which the lower ends of the bows 5 are to be connected in the usual manner.

The present invention, as above stated, contemplates the provision of a pair of supporting devices which are designed to be applied to the brackets 1 and 6 at each side of the automobile body and these supporting devices are of counterpart construction and consequently a description of one will suffice for both.

Each of the supporting devices above mentioned is preferably formed from a metallic rod of suitable length and indicated in the drawing by the numeral 7. This rod may be circular in cross section or of any other cross sectional contour and may of course, be of iron, brass, or any other material. At one end the rod is bent laterally, substantially at right angles, as at 8 and thence as at 9, parallel to its main portion so as to form a hook, and this hook is of a size to be engaged with either of the brackets 1. At its other end the rod 7 is provided with a head 10 which serves a purpose to be presently pointed out. A sleeve 11 is slidably adjustable upon the rod 7 and is designed to be held at adjustment by means of a set screw 12 threaded therethrough and bearing against the said rod. This sleeve 11 is provided at that side which is presented in the same direction as the hook above described, with a finger 13 which projects laterally from the said side of the sleeve and thence directly toward the bill 9 of the said hook, the body portion of this finger extending parallel to the main portion of the rod 7. In arranging each supporting device upon the automobile body, the hook above described is first engaged with one of the brackets 1 and the set screw 12 is then loosened and while the handle 10 is grasped in one hand and this end of the rod is supported the sleeve 11 is slid rearwardly upon the rod until its finger 13 engages with the corresponding forward bracket 6. The set-screw 12 is then tightened to hold the sleeve at adjustment. Freely slidable upon the rod 7 is a sleeve 14 having an eye 15 projecting from its upper side. After the rod has been arranged for support by the brackets 1 and 6, as above described, this sleeve 14 is slid rearwardly upon the rod, assuming that it is desired to set up the top, and the lower ends of the forward bows 5 are then disengaged from the ears 4 and are engaged in the respective eyes 15 of the respective sleeves 14. The said forward bows are then grasped and moved forwardly in a corresponding direction until these sleeves abut against the respective brackets 6, whereupon the lower ends of the bows are disengaged from the eyes 15 and are engaged in the eyes of the said brackets 6. The straps S, usually connected at the forward corners of the cover may then be grasped and pulled downwardly and forwardly so as to properly stretch the cover or top. Of course, when it is desired to let down the top, the above described operation is reversed.

From the foregoing description of the invention it will be seen that there is provided an extremely simple and inexpensive device which may be conveniently and successfully employed in assisting to set up an automobile top, and it will also be apparent that due to the fact that the sleeve is adjustable upon the rod 7, the device may be applied to automobiles in which the brackets for the respective rear and front bows are located at various distances apart. It will also be apparent that the head 10 in addition to serving as a hand-grip whereby the forward end of the rod may be supported while the sleeve 11 and its finger 13 are being adjusted, serves as a means for preventing loss of the sleeve 11.

In the form of the invention shown in Fig. 4 of the drawing, the rod is formed of telescopic sections $7^a$ and $7^b$ and it will be understood that by forming the rod in this manner, it may be collapsed to occupy but little space when not in use.

Having thus described the invention what is claimed as new is:—

In a device of the class described, a supporting rod having one end bent back upon itself to form a hook engageable with one of the brackets for the bows of a vehicle top, a sleeve slidable longitudinally upon the rod and provided at one side with a finger projecting at right angles therefrom and thence at right angles toward the first mentioned end of the rod, a set-screw threaded through the other side of the sleeve and arranged to bear against the rod, whereby to hold the sleeve at adjustment thereon, the said finger being adapted to be engaged with another one of the brackets for the said bows, a handle fixed at the other end of the rod, and a sleeve freely slidable upon the rod between the first mentioned end thereof and the first mentioned sleeve and provided with an eye.

OTIS COOK.

Witnesses:
W. H. BOYNTON,
J. T. REYNOLDS.

---

Copies of this patent may be obtained for five cents each, by addressing the "Commissioner of Patents, Washington, D. C."